United States Patent
Cho

(10) Patent No.: US 12,547,671 B2
(45) Date of Patent: Feb. 10, 2026

(54) METHOD AND DEVICE FOR OPERATING DEPTHWISE CONVOLUTION BY USING THE SYSTOLIC ARRAY

(71) Applicant: Research & Business Foundation Sungkyunkwan University, Suwon-si (KR)

(72) Inventor: Hyungmin Cho, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 1054 days.

(21) Appl. No.: 17/573,669

(22) Filed: Jan. 12, 2022

(65) Prior Publication Data

US 2022/0222315 A1    Jul. 14, 2022

(30) Foreign Application Priority Data

Jan. 12, 2021    (KR) .......................... 10-2021-0004086

(51) Int. Cl.
   *G06F 17/15*    (2006.01)
   *G06F 15/80*    (2006.01)

(52) U.S. Cl.
   CPC .......... *G06F 17/15* (2013.01); *G06F 15/8046* (2013.01); *G06F 17/153* (2013.01)

(58) Field of Classification Search
   CPC .... G06F 17/15; G06F 17/153; G06F 15/8046; G06N 3/04; G06N 3/0464; G06N 3/063
   See application file for complete search history.

(56) References Cited

U.S. PATENT DOCUMENTS

| 2018/0276532 A1 | 9/2018 | Kim et al. |
| 2019/0079801 A1 | 3/2019 | Lyuh et al. |

(Continued)

FOREIGN PATENT DOCUMENTS

| KR | 10-2018-0107869 A | 10/2018 |
| KR | 10-2019-0030564 A | 3/2019 |

(Continued)

OTHER PUBLICATIONS

C. Hyungmin, RiSA: A Reinforced Systolic Array for Depthwise Convolutions and Embedded Tensor Reshaping, ACM Trans. Embedd. Comput. Syst. 20, 5s, Article 54, Sep. 2021 (Year: 2021).*

(Continued)

*Primary Examiner* — Emily E Larocque
(74) *Attorney, Agent, or Firm* — NSIP Law

(57) ABSTRACT

The present disclosure includes a first step of preloading weight values of each filter into respective processing element (PE) chains through a column input link, a second step of supplying an input value to the column input link in the same order as the weight values of the preloaded filters, a third step of starting accumulation in a column output link matching the column input link when a first input value among the input values reaches a top end of the PE chains, a fourth step of moving while further accumulating a product of a facing input value and the weight values of the filter loaded at a corresponding position when the accumulated value moves and faces the input value supplied, and a fifth step of outputting an output value accumulated by multiplication when the accumulated value to be moved reaches a lowest end of the PE chains.

12 Claims, 7 Drawing Sheets

(56) References Cited

U.S. PATENT DOCUMENTS

| | | | |
|---|---|---|---|
| 2019/0244106 A1* | 8/2019 | Franca-Neto | G06N 3/063 |
| 2020/0175355 A1 | 6/2020 | Chung et al. | |
| 2021/0182186 A1* | 6/2021 | Lew | G06F 7/523 |
| 2022/0036165 A1* | 2/2022 | Kwon | G06F 17/153 |

FOREIGN PATENT DOCUMENTS

| | | |
|---|---|---|
| KR | 10-2019-0099931 A | 8/2019 |
| KR | 10-2020-0066538 A | 6/2020 |

OTHER PUBLICATIONS

M. Park et al., BiRD: Bi-Directional Input Reuse Dataflow for Enhancing Depthwise Convolution Performance on Systolic Arrays, IEEE Transactions on Computers, vol. 73, No. 12, 2024 (Year: 2024).*

Korean Office Action issued on Oct. 19, 2023, in counterpart Korean Patent Application No. 10-2021-0004086 (6 pages in Korean).

Korean Office Action issued on Jun. 17, 2022, in counterpart Korean Patent Application No. 10-2021-0004086 (5 pages in Korean).

\* cited by examiner

METHOD AND DEVICE FOR OPERATING DEPTHWISE CONVOLUTION BY USING THE SYSTOLIC ARRAY

CROSS-REFERENCE TO RELATED APPLICATION

This application is based on and claims priority under 35 U.S.C. 119 to Korean Patent Application No. 10-2021-0004086, filed on Jan. 12, 2021, the contents of which are all hereby incorporated by reference herein in their entirety.

BACKGROUND

Field

The present disclosure relates to a method and a device for operating a depthwise convolution using a systolic array, and more specifically, to a method and a device for operating a depthwise convolution using a systolic array capable of improving an operation speed for a depthwise convolution without significantly changing a conventional lattice-type systolic array structure.

Description of Related Art

A general systolic array has a structure that increases computational efficiency such as matrix multiplication and convolution by connecting a basic hardware module called a processing element (PE) that performs a multiply-and-accumulate operation in a lattice form. In the case of a general deep neural network or convolutional neural network (CNN), it is possible to maximize computational efficiency by using such a systolic array structure.

Recently, a technique called depthwise convolution has been used to solve the high computational requirements of CNN-based machine learning models in mobile or edge environments. In the depthwise convolution, each channel of input data is connected with only one weight filter during convolution operation, so the amount of absolute calculation can be reduced, but one input value is used only a few times. As such, in the case of calculation with low reusability, since it does not match the structure of the systolic array in which the PEs are disposed in a lattice form, the utilization ratio of the systolic array becomes very low. For example, in the case of a general systolic array in which PEs are arranged by N horizontally and vertically ($N^2$ in total), only N PEs are used in the depthwise convolution operation, so that the computational efficiency of the systolic array is reduced to 1/N.

As a method to solve this problem, there are methods for maximizing the use of given PEs even with low reusability calculations by connecting an additional data path (datapath or interconnect) in addition to disposing the PEs in a lattice form, but there is a problem in that a significant overhead occurs in order to add a data path for freely connecting the PEs in this way.

SUMMARY

An object of the present disclosure is to provide a method and a device for operating a depthwise convolution using a systolic array capable of improving an operation speed for the depthwise convolution without significantly changing a conventional lattice-type systolic array structure.

The technical objects to be achieved in the present disclosure are not limited to the above-mentioned matters, and other technical problems not mentioned may be considered by those of ordinary skill in the art to which the present disclosure pertains from the embodiments of the present disclosure to be described below.

A method for operating a depthwise convolution using a systolic array of the present disclosure includes a first step of preloading weight values of each filter into respective processing element (PE) chains through a column input link; a second step of supplying an input value to the column input link in the same order as the weight values of the preloaded filters; a third step of starting accumulation in a column output link matching the column input link when a first input value among the input values reaches a top end of the PE chain; a fourth step of moving while further accumulating a product of a facing input value and the weight values of the filter loaded at a corresponding position when the accumulated value moves through the column output link and faces the input value supplied through the column input link; and a fifth step of outputting an output value accumulated by multiplication when the accumulated value to be moved reaches a lowest end of the PE chains.

In addition, it may be included that an order in which the input value elements are supplied in the second step is supplied to the column input link in column-major order.

In addition, it may be included that some input value elements of the input values supplied to the first input value overlap with input values supplied to a second input value.

In addition, it may be included that the second input value supplies remaining input values except for the input values overlapping with the first input value.

In addition, it may be included that an empty slot is formed in the column input link by supplying a zero value between the input values supplied to the column input link.

In addition, it may be included that in the second step, input values from a different part of the input feature map are supplied to the column input link by utilizing the empty slots formed in the column input link, and two depthwise convolution are overlapped and calculated simultaneously.

In addition, a device for operating a depthwise convolution using a systolic array of the present disclosure includes a processor configured to control to operate a depthwise convolution using a plurality of input values and a plurality of weight values of filters; and a mux unit configured to select the plurality of input values under control of the processor and supply them to a column input link, wherein the processor is configured to control to: preload weight values of the filter into respective processing element (PE) chains through a column input link, supply an input value to the column input link in the same order as the weight values of the preloaded filters, start accumulation in a column output link matching the column input link when a first input value among the input values reaches a top end of the PE chains, move while further accumulating a product of a facing input value and the weight values of the filter loaded at a corresponding position when the accumulated value moves through the column output link and faces the input value supplied through the column input link, and output an output value accumulated by multiplication when the accumulated value to be moved reaches a lowest end of the PE chains.

In addition, it may be included that the processor is configured to control an order in which the input value elements are supplied to be supplied to the column input link in column-major order.

In addition, it may be included that the processor is configured to control some input value elements of the input values supplied to the first input value to be overlapped with input values supplied to a second input value.

In addition, it may be included that the processor is configured to control remaining input values to be supplied except for the input values overlapping with the first input value from the second input value.

In addition, it may be included that the processor is configured to control an empty slot to be formed in the column input link by supplying a zero value between the input values supplied to the column input link.

In addition, it may be included that the processor is configured to control input values from a different part of the input feature map to be supplied to the column input link by utilizing the empty slots formed in the column input link, and two depthwise convolution to be overlapped and calculated simultaneously.

The above-described aspects of the present disclosure are only some of the preferred embodiments of the present disclosure, and various embodiments in which the technical features of the present disclosure are reflected may be derived and understood by those of ordinary skill in the art based on the detailed description of the present disclosure to be described below.

According to the embodiments of the present disclosure, the following effects can be obtained.

The present disclosure can improve the operation speed by applying CNN models with added depthwise convolution operation to the systolic array without a complex accelerator structure.

The present disclosure can increase the speed and power efficiency of using an artificial intelligence model because even in a mobile environment, a systolic array specialized for neural networks, not general-purpose computing devices such as CPUs or GPUs, can be applied with low overhead.

The effects obtainable in the embodiments of the present disclosure are not limited to the above-mentioned effects, and other effects not mentioned can be clearly derived and understood by those of ordinary skill in the art to which the present disclosure pertains from the description of the embodiments of the present disclosure below. That is, unintended effects of implementing the present disclosure may also be derived by those of ordinary skill in the art from the embodiments of the present disclosure.

BRIEF DESCRIPTION OF THE DRAWINGS

The accompanying drawings, which are included as a part of the description to help understanding the present disclosure, provide various embodiments of the present disclosure. In addition, the accompanying drawings are used to describe embodiments of the present disclosure with the description.

DETAILED DESCRIPTION

Figure 1:
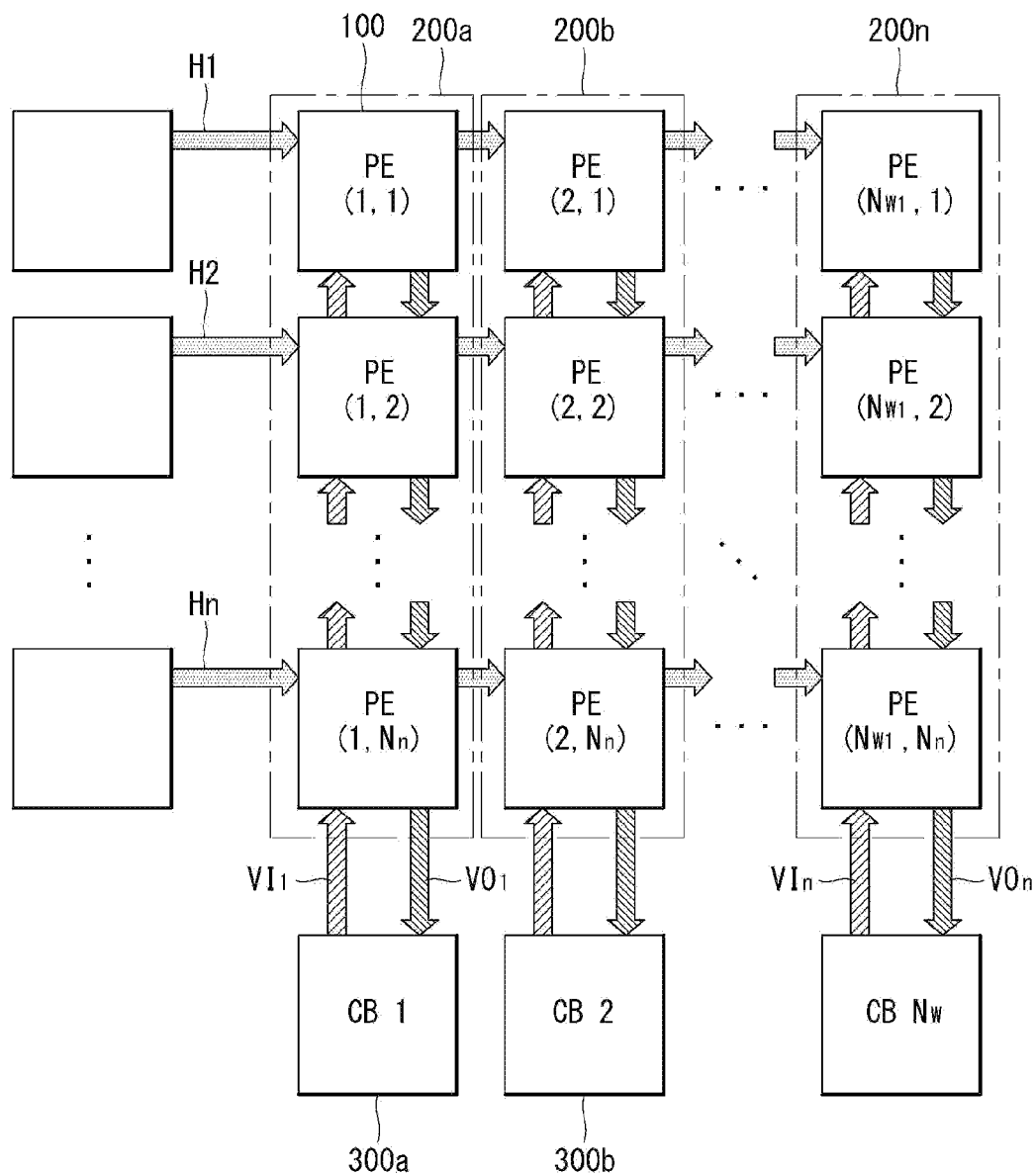
FIG. 1 is a view showing an overall structure of a systolic array of the present disclosure.

Hereinafter, a method and device for operating a depthwise convolution using a systolic array will be described as embodiments of the present disclosure.

The following embodiments combine elements and features of the present disclosure in a predetermined form. Each element or feature may be considered optional unless explicitly stated otherwise. Each element or feature may be implemented in a form that is not combined with other elements or features. In addition, some elements and/or features may be combined to constitute an embodiment of the present disclosure. The order of operations described in the embodiments of the present disclosure may be changed. Some configurations or features of one embodiment may be included in another embodiment, or may be replaced with corresponding configurations or features of another embodiment.

In the description of the drawings, parts, devices, and/or configurations that may obscure the gist of the present disclosure are not described, and parts, devices, and/or configurations that could be understood at the level of those skilled in the art are also not described. In addition, in the drawings, parts referred to using the same reference numerals mean the same elements or steps in a device configuration or method.

Throughout the specification, when a part is said to "comprising or including" a certain element, this means that other elements may be further included without excluding other elements unless otherwise stated. In addition, terms such as "~ unit" or "~ group" described in the specification mean a unit for processing at least one function or operation. Also, the terms "a or an", "one", "the" and similar related terms may be used in a sense including both the singular and the plural in the context of describing the present disclosure (especially, in the context of the following claims) unless otherwise indicated in the present disclosure or otherwise clearly contradicted by context.

In addition, specific terms and/or symbols used in the embodiments of the present invention are provided to help the understanding of the present invention, and the use of these specific terms may be changed to other forms without departing from the technical spirit of the present disclosure.

FIG. 1 is a view showing an overall structure of a systolic array of the present disclosure.

Referring to FIG. 1, the overall structure of the systolic array of the present disclosure may include a processing element (PE, hereinafter referred to as PE, 100) disposed in a two-dimensional array.

Each PE 100 may have three types of data links: horizontal input links $H_1$ to $Hn$, vertical input links $VI_1$ to $VIn$, and vertical output links $VO_1$ to $VOn$. The horizontal input links $H_1$ to $Hn$ may be referred to as row input links, the vertical input links $VI_1$ to $VIn$ may be referred to as column input links, and the vertical output links $VO_1$ to $VOn$ may be referred to as column output links.

In the following description, the term "horizontal", "vertical", "row", and "column" are for purposes of explanation and therefore, it should be noted that, with respect to the overall structure for the systolic array of the present invention, it is not limited to a case in which a specific direction is set as a reference, but any direction is possible as a reference. It will be appreciated by those skilled in the art that it is not limited to the term related to indication of the direction in the implementation of the present invention, even when the entire structure of the present invention is rotated 90 degrees or transposed.

In the case of a general matrix operation or convolution operation, a weight value is loaded into registers of each PE 100 through the vertical input links $VI_1$ to VIn, and an input value is supplied through the horizontal input link. Each PE 100 multiplies the input value and the weight value, accumulates it through the vertical output links $VO_1$ to VOn, and stores the result in buffers CB, 300a to 300n.

On the contrary, in the present disclosure, by arranging a mux unit (refer to FIG. 2, 110) to be described later in each PE 100, both the weight value load and the input value supply may be processed using only the vertical input link without using the horizontal input link when operating a depthwise convolution.

PE chains 200a to 200n may include at least one PE 100. The PE chains 200a to 200n may be electrically connected to the buffers 300a to 300n to receive an input value or a weight value of a filter from the buffers 300a to 300n, and may provide an output value to the buffers 300a to 300n.

Each PE chain 200a to 200n may include the vertical input links $VI_1$ to VIn (or column input links) and the vertical output links $VO_1$ to VOn (or column output links).

The vertical input links $VI_1$ to VIn (or column input links) and the vertical output links $VO_1$ to VOn (or column output links) may be arranged to match each other. The lowermost ends of the vertical input links $VI_1$ to VIn (or column input links) and the lowermost ends of the vertical output links $VO_1$ to VOn (or column output links) may be disposed closest to the buffers 300a to 300n, and the uppermost ends of the vertical input links $VI_1$ to VIn (or column input links) and the uppermost ends of the vertical output links $VO_1$ to VOn (or column output links) may be disposed furthest from the buffers 300a to 300n.

A detailed description thereof will be described with reference to FIGS. 2 to 6 to be described later.

Figure 2:
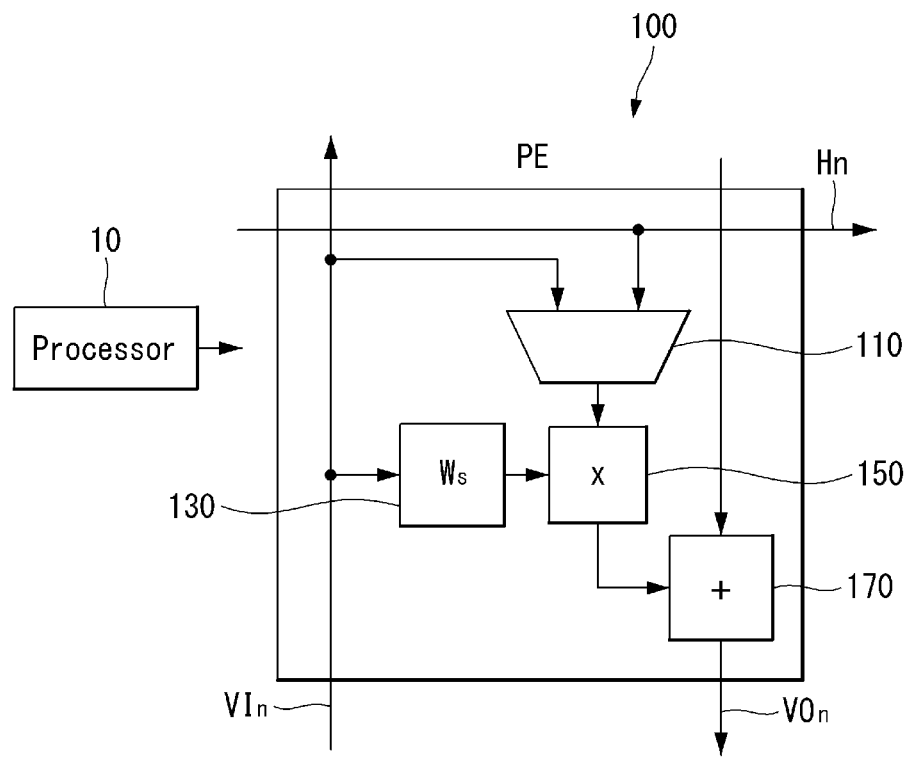
FIG. 2 is a view for describing an internal structure of each PE according to an embodiment of the present disclosure.

FIG. 2 is a view for describing an internal structure of each PE according to an embodiment of the present disclosure.

Referring to FIG. 2, the PE 100 according to an embodiment of the present disclosure may be electrically connected to a processor 10 and may be controlled by the processor 10.

The PE 100 may include a weight storage unit 130, a mux unit 110, a multiplication operation unit 150, and an addition operation unit 170.

The weight storage unit 130 may be electrically connected to the column input link VIn, and may transmit the weight value of the filter to the multiplication operation unit 150.

The mux unit 110 may be electrically connected to the horizontal input link Hn and the vertical input link VIn (or column input link), and may receive an input value that is an operator of a multiplication operation through the horizontal input link Hn or the vertical input link VIn and transmit it to the multiplication operation unit 150. In general, the horizontal input link is used when performing matrix multiplication or convolution operation, and the vertical link is used only for weight loading, but in the present disclosure, an input value may be supplied through the mux unit 110 during the depthwise convolution operation. That is, in the present disclosure, the input to the multiplier may be selected from the horizontal link or the vertical link according to the general mode and the depthwise convolution mode by disposing the mux unit 110 inside the PE 100. The depthwise convolution may be referred to as depth-major convolution.

The multiplication operation unit 150 may be electrically connected to the weight storage unit 130 and the mux unit 110, and may perform a multiplication operation on the values transmitted therefrom and transmit it to the addition operation unit 170.

The addition operation unit 170 may be electrically connected to the vertical output link, and may output an output value by performing an addition operation on an accumulated value transmitted through the vertical output link VOn with a value transmitted from the multiplication operation unit.

Figure 3:
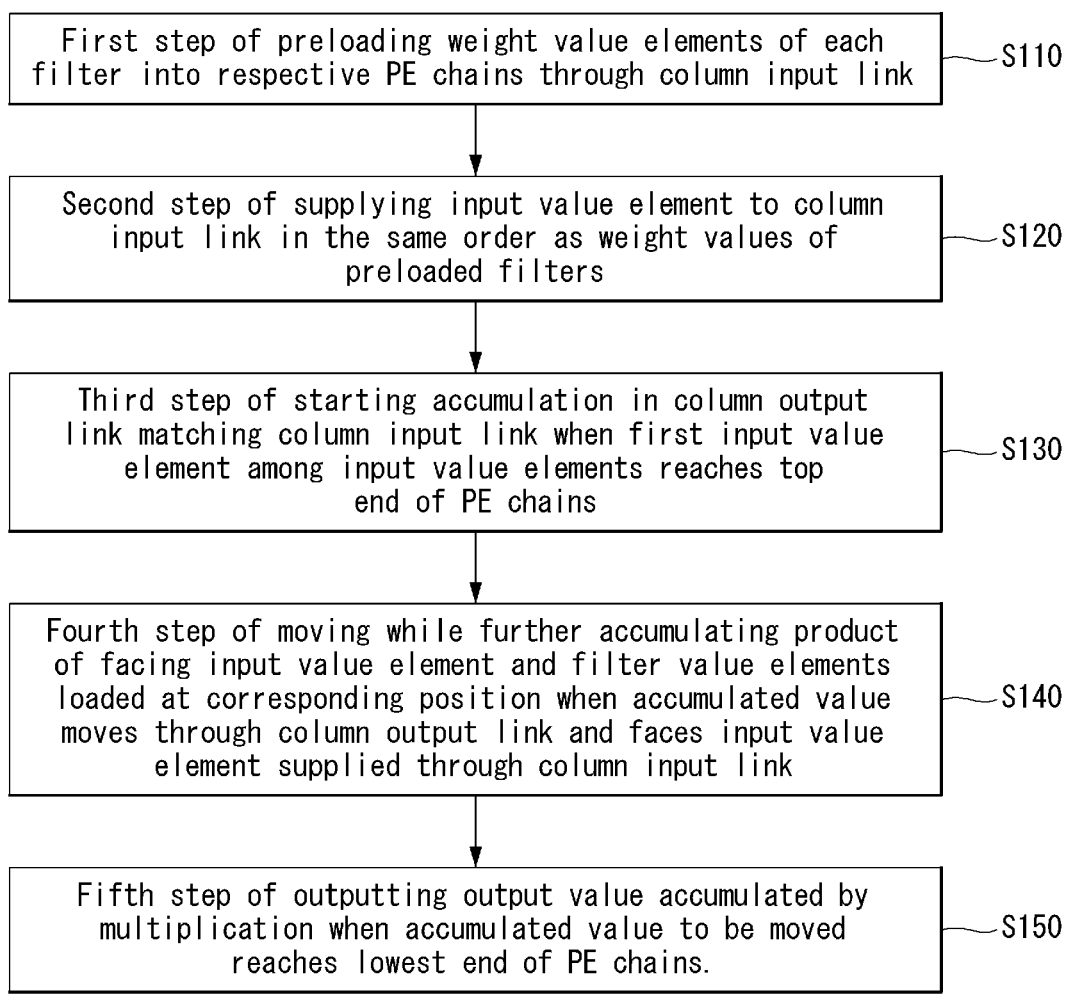
FIG. 3 is a diagram for describing a method for operating a depthwise convolution using a systolic array of the present disclosure.

FIG. 3 is a diagram for describing a method for operating a depthwise convolution using a systolic array of the present disclosure.

Referring to FIG. 3, the method for operating a depthwise convolution using a systolic array of the present disclosure may include a first step S110 to a fifth step S150.

In the first step S110, the weight values of each filter may be preloaded into respective PE chains through a column input link. In the first step S110, the weight values of the filter may be sequentially loaded into the column input links in advance under the control of a processor, which will be described later.

In the second step S120, an input value may be supplied to the column input link in the same order as the weight values of the preloaded filters. In the second step, input values may be supplied or input to the column input link under the control of a processor, which will be described later. The processor may supply or input the input value to the column input link based on the weight value of the preloaded filter. The second step may sequentially move the input value upward.

In addition, the order in which the input value elements are supplied in the second step S120 may be supplied to the column input link in column-major order. In addition, some input value elements among the input values supplied to the first input value may overlap with input values supplied to the second input value. Accordingly, the second input value may supply the remaining input values except for input values overlapping with the first input value. A detailed description thereof will be provided later.

In addition, it may be included that in the second step, input values from a different part of the input feature map are supplied to the column input link by utilizing the empty slots formed in the column input link, and two depthwise convolution are overlapped and calculated simultaneously.

In the third step S130, when a first input value among the input values reaches a top end of the PE chains, accumulation may start in a column output link matching the column input link. In the third step S130, when the first input value input to the column input link under the control of the processor is sensed or reached at the top end of the PE chains or the top end of the column input link, the input value and the weight value of the filter may be calculated. In the third step, an accumulated value obtained by calculating an input value and a weight value of the filter under the control of the processor may be accumulated on the column output link matching the column input link.

In the fourth step S140, when the accumulated value moves through the column output link and faces the input value supplied through the column input link, it may move while further accumulating a product of a facing input value and the weight values of the filter loaded at a corresponding position. In the fourth step S140, the accumulated values may be sequentially moved downward under the control of the processor. In the fourth step S140, when the accumulated value faces or matches the input value supplied to the column input link under the control of the processor, it may be accumulated by adding the product of the matched input value and the weight value of the filter loaded in the corresponding position.

In the fifth step S150, when the accumulated value to be moved reaches a lowest end of the PE chains, an output value accumulated by multiplication may be output. In the fifth step S150, when the first accumulated value accumulated in the column output link is sensed or reached at the lowest end of the PE chains or the lowest end of the column output link under the control of the processor, the output value may be output. The output value may be stored in a buffer (CB).

Figure 4:
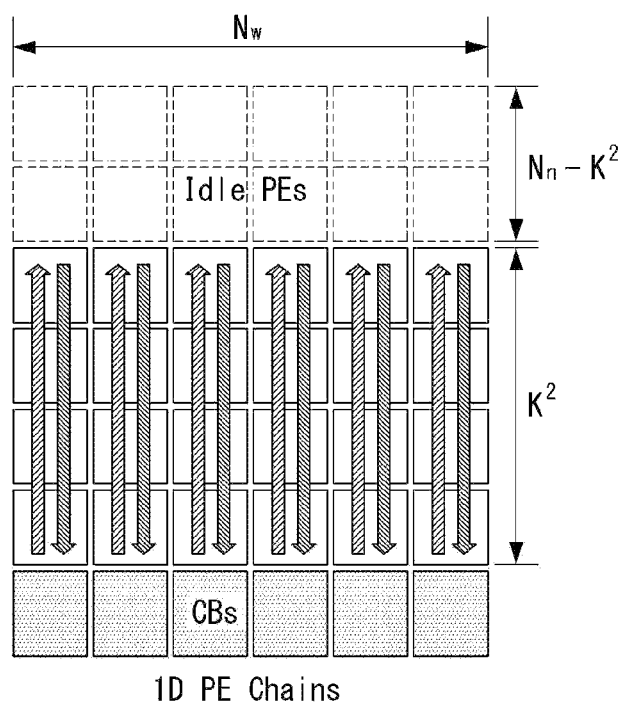
FIG. 4 is a diagram for describing that PEs are used while being connected only in a vertical form during a depthwise convolution operation according to an embodiment of the present disclosure.

FIG. 4 is a diagram for describing that PEs are used while being connected only in a vertical form during a depthwise convolution operation according to an embodiment of the present disclosure.

Referring to FIG. 4, the filter used for the depthwise convolution operation of the present disclosure may be formed in various sizes.

For example, when the size of the filter used for the depthwise convolution operation of the present disclosure is K×K, $K^2$ PEs may be used for each PE column, and the rest may be maintained in an idle state. In this case, K may be a natural number of 2 or more.

The filter used for the depthwise convolution operation of the present disclosure uses only through the vertical input links (or column input link) and vertical output links (or column output link) of the $K^2$ PEs to be used, so that a chain of PEs connected in one dimension may be substantially formed.

At this time, each PE chain may be in charge of an individual channel of the depthwise convolution.

Figure 5:
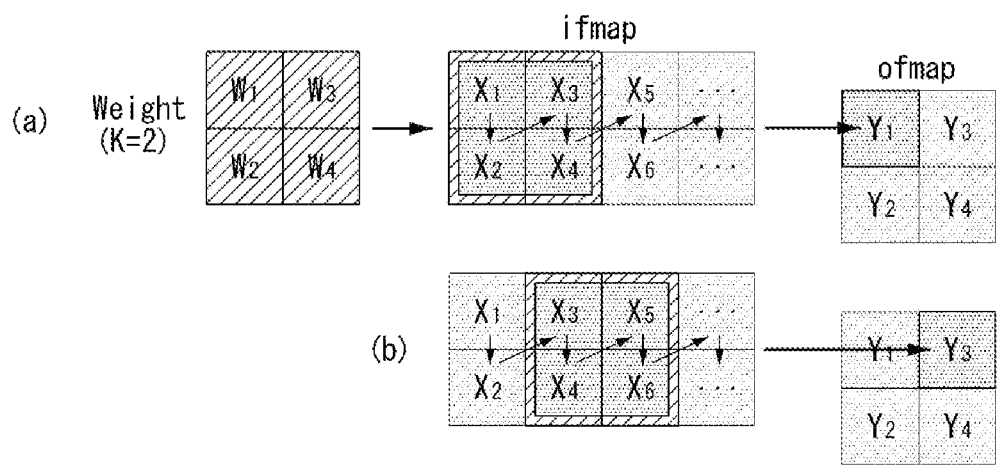
FIG. 5 is a diagram for describing a conceptual diagram of a depthwise convolution operation to be processed by the present disclosure.

FIG. 5 is a diagram for describing a conceptual diagram of a depthwise convolution operation to be processed by the present disclosure.

As shown in (a) of FIG. 5, when the size of the filter used in the depthwise convolution operation of the present disclosure is K×K (K=2), the weight values of the filter may be $W_1$, $W_2$, $W_3$, and $W_4$.

For example, if $W_1$ is input to the (1,1) space of the filter, $W_2$ may be input to the (1,2) space disposed below $W_1$. $W_3$ may be input in the (2,1) space disposed to the right of $W_1$. $W_4$ may be input in the (2,2) space disposed to the right of $W_2$ and below $W_3$. The filter may be referred to as a weight map. $W_1$, $W_2$, $W_3$, and $W_4$ may be sequentially input.

When the weight values of the filter are loaded or input, the input values may be input to the filter in substantially the same order based thereon. The input values may be $X_1$, $X_2$, $X_3$, and $X_4$.

For example, if $X_1$ is input to the (1,1) space of the input filter, $X_2$ may be input to the (1,2) space disposed below $X_1$. $X_3$ may be input in the (2,1) space disposed to the right of $X_1$. $X_4$ may be input in the (2,2) space disposed to the right of $X_2$ and below $X_3$. The input filter may be referred to as an input map. $X_1$, $X_2$, $X_3$ and $X_4$ may be sequentially input.

The processor may multiply each of the input values ($X_1$ to $X_4$) input to the input filter by the weight values of each filter input to the filter matching the input filter, and then may generate an accumulated output value $Y_1$.

The processor may calculate the output value $Y_1$ through Equation 1.

$$\Sigma_{i=1}^{K^2} X_i \cdot W_i \quad \text{[Equation 1]}$$

Thereafter, in order to generate the second output value $Y_3$, as shown in (b) of FIG. 5, it is calculated in the form that the input filter is moved one space to the right, and the new input values ($X_5$ and $X_6$) in the next row are newly added to the calculation, so that the processor may calculate a new output value.

Figure 6:
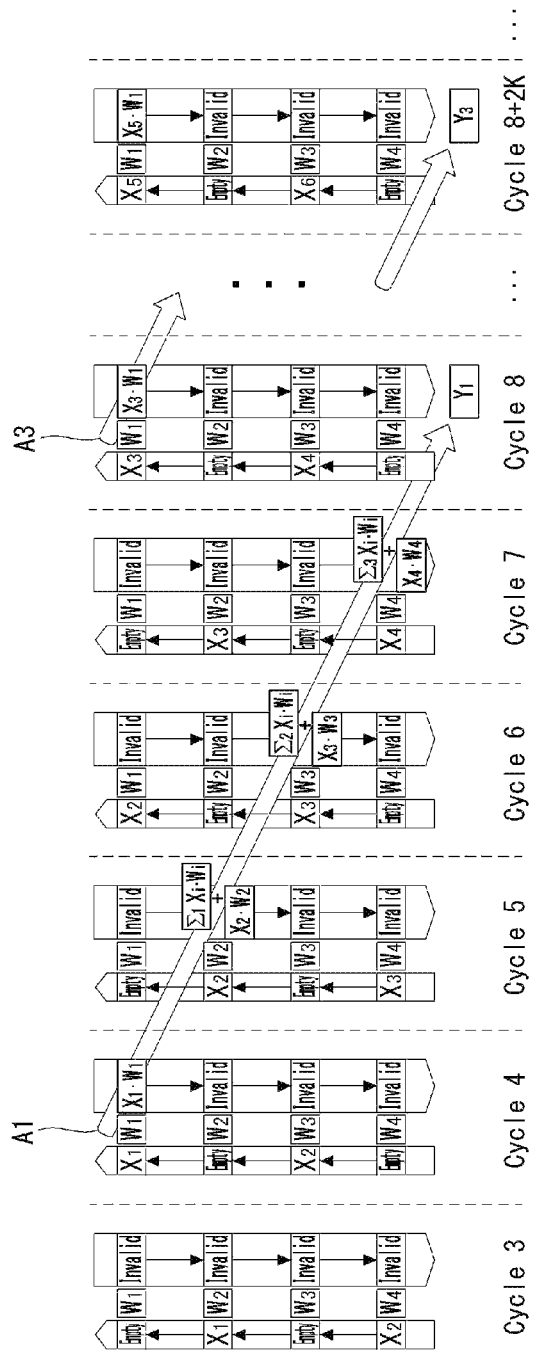
FIG. 6 is a diagram for describing a method for each individual PE chain to operate a depthwise convolution according to an embodiment of the present disclosure.

FIG. 6 is a diagram for describing a method for each individual PE chain to operate a depthwise convolution according to an embodiment of the present disclosure.

Referring to FIG. 6, the method for each individual PE chain to actually operate a depthwise convolution ($A_1$, $A_3$) according to an embodiment of the present disclosure is expressed as the state of the PE chain for each cycle when a 2×2 filter size is used.

The weight values $W_1$ to $W_4$ of each filter may be loaded into the respective PEs through the vertical input link in advance under the control of the processor.

Thereafter, the input values may be supplied through the vertical input link like weight values $W_1$ to $W_4$ under the control of the processor.

In this case, the processor may load the order in which the input values are input in column-major order. That is, the processor may supply the input values of the first row (e.g. $X_1$ and $X_2$) of the input values corresponding to each filter to the vertical input link, and then supply the input values of the next row (e.g. $X_3$ and $X_4$).

In this way, if the processor supplies the input values to the PE chain in column-major order, this is because, when calculating the second input value, there is no need to input all necessary input values into the PE chain again, but only newly necessary input values (e.g. $X_5$ and $X_6$) need to be input in addition to the input values (e.g. $X_1$ to $X_4$) used in the previous calculation.

When the first input value (e.g. $X_1$) reaches the top of the PE chain through the column input link (cycle 4 in FIG. 6), the processor may start accumulating through the column output link. The processor may encounter or match the input values supplied through the column input link as the accumulated value moves through the column output link. The processor may further accumulate the product of the encountered or matched input value and the weight value of the filter loaded at the corresponding position, and move the accumulated accumulation value through the column output link.

When the accumulated value reaches the lowest end of the PE chain through the column output link (cycle 8 in FIG. 6), the processor may complete the accumulation of all multiplications for one output value.

As described above, when additionally accumulating the accumulated values through the column output link, when supplying the input values through the column input link in order to accumulate it with the correct input values, the processor may control to leave a gap of 1 cycle between each input value. That is, the processor may accurately add the input value to the accumulated value by supplying a zero value between the input values supplied to the column input link to form an empty slot or a blank space in the column input link.

In addition, it may be included that the processor is configured to control input values from a different part of the input feature map to be supplied to the column input link by utilizing the empty slots formed in the column input link, and two depthwise convolution to be overlapped and calculated simultaneously.

In other words, after 2K cycles after the calculation of the first input value ($X_1$) starts in cycle 4 shown in FIG. 6, that is, the processor may control the first input value ($X_3$) for the second output value ($Y_3$) in cycle 8 shown in FIG. 6 to reach the top end of the PE chain. From this point, the accumulation calculation of the second output value may be started.

If each individual PE chain according to the above-described embodiment of the present disclosure calculates the depthwise convolution in a way that operate the depthwise convolution ($A_1$, $A_3$), since one output value is calculated every 2K cycles, it is possible to bring about a K/2 times increase in efficiency compared to a systolic array, which has an existing computational efficiency of 1/N.

Figure 7:
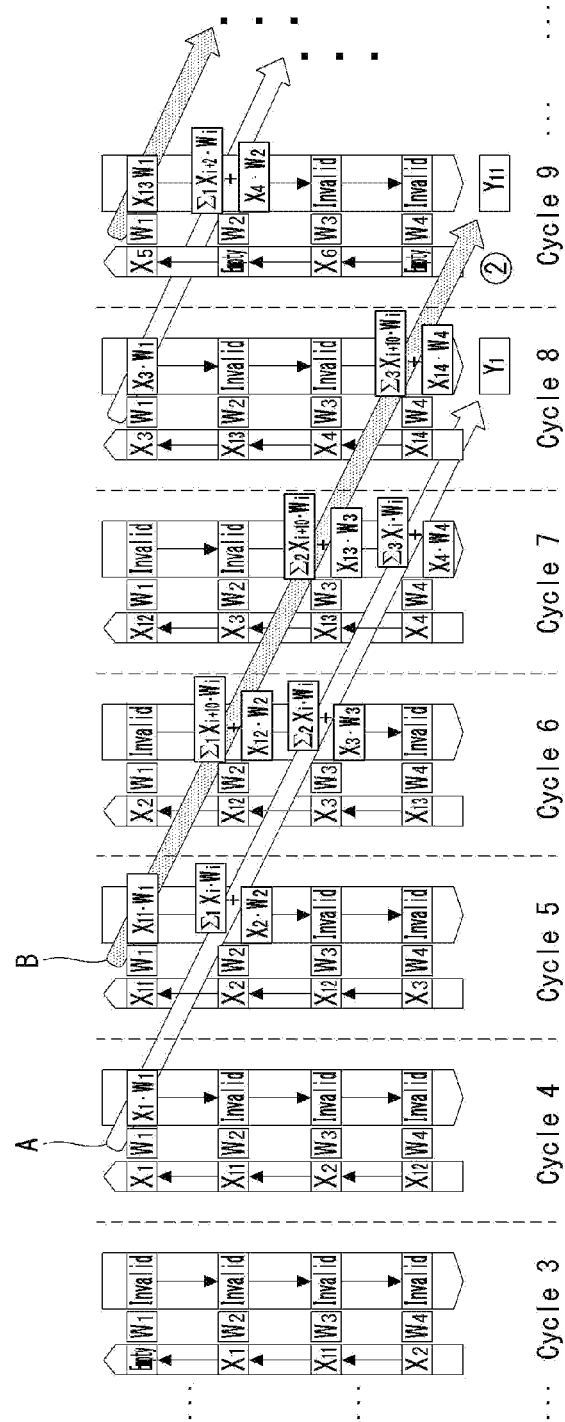
FIG. 7 is a diagram for describing a method for each individual PE chain to operate a depthwise convolution according to another embodiment of the present disclosure.

FIG. 7 is a diagram for describing a method for each individual PE chain to operate a depthwise convolution according to another embodiment of the present disclosure.

As shown in FIG. 7, a method for each individual PE chain to operate a depthwise convolution according to another embodiment of the present disclosure may be calculated by overlapping two depthwise convolution operations (A, B) without performing only one depthwise convolution operation at a time by utilizing the fact that there is a gap of one cycle between each input value.

The method for each individual PE chain to operate a depthwise convolution according to another embodiment of the present disclosure may increase the computational efficiency by K times rather than K/2 times by overlapping two depthwise convolution operations (A, B). In this case, since two output values can be generated every 2K cycle, it is possible to achieve a total K times increase in operation speed compared to the existing basic systolic array structure.

The above-described embodiments of the present disclosure may be embodied in other specific forms without departing from the essential characteristics of the present disclosure. Accordingly, the above-described description should not be construed as being limitative from all aspects, but should be construed as being illustrative. The scope of the present disclosure should be determined by reasonable analysis of the attached claims, and all changes within the equivalent range of the present disclosure are included in the scope of the present disclosure. In addition, claims that are not explicitly cited in the claims may be combined to form an embodiment, or may be included as new claims by amendment after filing.

What is claimed is:

1. A method for operating a depthwise convolution using a systolic array, the method comprising:
   operating the depthwise convolution using a plurality of input values and a plurality of weight values of filters;
   selecting the plurality of input values under control of a processor and supplying the plurality of input values to a column input link;
   preloading weight values of each of the filters into respective processing element (PE) chains through a column input link;
   supplying an input value to the column input link in the same order as the weight values of the preloaded filters;
   starting accumulation in a column output link matching the column input link in response to a first input value among the input values reaching a top end of the PE chains;
   when the accumulated value moves through the column output link and faces the input value supplied through the column input link, accumulating a product of a facing input value and the weight values of the filter loaded at a corresponding position; and
   outputting an output value accumulated by multiplication when the accumulated value to be moved reaches a lowest end of the PE chains.

2. The method of claim 1, wherein an order in which the input value elements are supplied in the second step is supplied to the column input link in column-major order.

3. The method of claim 1, wherein some input value elements of the input values supplied to the first input value overlap with input values supplied to a second input value.

4. The method of claim 3, further comprising:
   providing remaining input values except for the input values overlapping with the first input value.

5. The method of claim 1, wherein an empty slot is formed in the column input link by supplying a zero value between the input values supplied to the column input link.

6. The method of claim 5, further comprising:
   inputting values from a different part of the input feature map to be supplied to the column input link by utilizing the empty slots formed in the column input link, and two depthwise convolution are overlapped and calculated simultaneously.

7. A device for operating a depthwise convolution using a systolic array, comprising:
   a processor configured to control to operate the depthwise convolution using a plurality of input values and a plurality of weight values of filters; and
   a mux unit configured to select the plurality of input values under control of the processor and supply the plurality of the input values to a column input link,
   wherein the processor is further configured to control to:
      preload weight values of each of the filters into respective processing element (PE) chains through a column input link;
      supply an input value to the column input link in the same order as the weight values of the preloaded filters;
      start accumulation in a column output link matching the column input link in response to a first input value among the input values reaching a top end of the PE chains;
      when the accumulated value moves through the column output link and faces the input value supplied through the column input link, accumulate a product of a facing input value and the weight values of the filter loaded at a corresponding position; and
      output an output value accumulated by multiplication when the accumulated value to be moved reaches a lowest end of the PE chains.

8. The device of claim 7, wherein the processor is further configured to control an order in which the input value elements are supplied to be supplied to the column input link in column-major order.

9. The device of claim 7, wherein the processor is further configured to control some input value elements of the input values supplied to the first input value to be overlapped with input values supplied to a second input value.

10. The device of claim 9, wherein the processor is further configured to control remaining input values to be provided except for the input values overlapping with the first input value from the second input value.

11. The device of claim 7, wherein the processor is further configured to control an empty slot to be formed in the column input link by supplying a zero value between the input values supplied to the column input link.

12. The device of claim 11, wherein the processor is further configured to control input values from a different part of the input feature map to be supplied to the column input link by utilizing the empty slots formed in the column input link, and two depthwise convolution to be overlapped and calculated simultaneously.

\* \* \* \* \*